US 6,674,201 B2

(12) United States Patent
Liu et al.

(10) Patent No.: US 6,674,201 B2
(45) Date of Patent: Jan. 6, 2004

(54) SPINDLE MOTOR WITH AN AERODYNAMIC AND HYDRODYNAMIC BEARING ASSEMBLY

(75) Inventors: Zhejie Liu, Singapore (SG); QiDe Zhang, Singapore (SG); Shixin Chen, Singapore (SG); Teck Seng Low, Singapore (SG)

(73) Assignee: Data Storage Institute, Singapore (SG)

( * ) Notice: Subject to any disclaimer, the term of this patent is extended or adjusted under 35 U.S.C. 154(b) by 0 days.

(21) Appl. No.: 09/558,453

(22) Filed: Apr. 25, 2000

(65) Prior Publication Data

US 2003/0025409 A1 Feb. 6, 2003

(30) Foreign Application Priority Data

Dec. 23, 1999 (SG) ................................. 9906597

(51) Int. Cl.[7] .................................................. H02K 5/00
(52) U.S. Cl. ........................ 310/91; 310/90; 310/67 R; 360/99.08
(58) Field of Search ......................... 310/91, 90, 67 R; 384/107, 111, 113; 360/98.07, 98.06, 99.04, 99.08

(56) References Cited

U.S. PATENT DOCUMENTS

| 4,200,344 A | | 4/1980 | Binns et al. | |
|---|---|---|---|---|
| 4,696,584 A | * | 9/1987 | Tielemans | 384/107 |
| 4,892,418 A | * | 1/1990 | Asada et al. | 384/124 |
| 5,142,176 A | * | 8/1992 | Takahashi | 310/90.5 |
| 5,193,084 A | * | 3/1993 | Christiaens | 369/258 |
| 5,358,339 A | | 10/1994 | Konno et al. | |
| 5,770,906 A | | 6/1998 | Hazelton et al. | |
| 5,850,318 A | * | 12/1998 | Dunfield et al. | 360/99.08 |
| 5,969,448 A | | 10/1999 | Liu et al. | |
| 6,071,014 A | * | 6/2000 | Lee et al. | 384/107 |

FOREIGN PATENT DOCUMENTS

| JP | 6/351190 | 12/1994 |
|---|---|---|
| JP | 11/275807 | 10/1999 |

* cited by examiner

*Primary Examiner*—Thanh Lam
(74) *Attorney, Agent, or Firm*—Oppenheimer, Wolff & Donnelly LLP

(57) ABSTRACT

A spindle motor (10) including a stator component (16), a rotor component (18), including a hub (14) for supporting one or more discs, and a bearing assembly between tHe components, formed of a journal bearing (54) and a thrust bearing (52), wherein the journal bearing (54) is an aerodynamic bearing and the thrust bearing is adapted to function in a bi-directional manner and includes an annular member (30) projecting radially from one of the components into an associated recess (76) formed in the other of the components. Preferably, the annular member has two opposed bearing faces (68,70) arranged adjacent corresponding bearing surfaces of the recess, and a hydrodynamic bearing is formed between the respective bearing faces and surfaces.

6 Claims, 5 Drawing Sheets

SPINDLE MOTOR WITH AN AERODYNAMIC AND HYDRODYNAMIC BEARING ASSEMBLY

FIELD OF THE INVENTION

The present invention relates to a spindle motor and, in particular, to a bearing assembly of such a motor.

BACKGROUND OF THE INVENTION

A spindle motor in general comprises a stator and a rotor, including a hub for supporting an optical or magnetic disc or the like. A bearing assembly is provided between the stator and the rotor and consists of a journal bearing and a thrust bearing. It is known to provide both the thrust and journal bearings as hydrodynamic bearings. However, lubricant used in such bearings can be somewhat difficult to seal and may contaminate the recording medium of the disc mounted to the rotor if fluid migration from the bearing occurs. Hydrodynamic bearings also have a disadvantage of high frictional losses during operation.

Aerodynamic bearings may be utilised instead of hydrodynamic bearings, to reduce frictional losses and allow for increased operating speeds, however, aerodynamic bearings have relatively low bearing stiffness.

A spindle motor, as disclosed in U.S. Pat. No. 4,200,344, ameliorates the above disadvantages by using a liquid lubricant for the journal bearing only and providing an aerodynamic for the thrust bearing. However, the thrust bearing is only adapted to function in a uni-directional manner, which is not desirable for practical disc drives.

U.S. Pat. No. 5,358,339 also discloses a spindle motor with a liquid journal. That motor includes two flat thrust plates at either end of the journal bearing to thereby provide for bi-direction axial support. A disadvantage of such a motor though is that the thrust plates, which need to be of a sufficient size to generate suitable aerodynamic pressure to form a gas bearing, increase the overall volume dimension and space requirements of the motor.

SUMMARY OF THE INVENTION

The present invention seeks to address the above mentioned disadvantages.

In accordance with the invention, there is provided a spindle motor including a stator component, a rotor component, including a hub for supporting one or more discs, and a bearing assembly between the components, formed of a journal bearing and a thrust bearing, wherein the journal bearing is an aerodynamic bearing and the thrust bearing is adapted to function in a bi-directional manner and includes an annular member projecting radially from one of the components into an associated recess formed in the other of the components.

Preferably, the journal bearing is formed between a shaft of one of the components and an associated sleeve of the other one of the components and the shaft is provided with a passage extending therethrough for providing air flow through the motor to the aerodynamic bearing, so as to allow air to be entrained into the journal bearing during operation.

Preferably, the annular member has two opposed bearing faces arranged adjacent corresponding bearing surfaces of the recess, and a hydrodynamic bearing is formed between the respective bearing faces and surfaces.

Preferably, the bearing surfaces diverge from the bearing faces adjacent the shaft so that liquid between the annular member and the recess is retained therebetween by surface tension seals.

Preferably, the shaft includes a thrust bearing passageway which includes a port opening adjacent the annular member, between the thrust bearing and the journal bearing for equalising air pressure at either side of the journal bearing.

Preferably, the shaft is fixed relative to the stator and the sleeve forms part of the rotor.

DETAILED DESCRIPTION OF A PREFERRED EMBODIMENT

Figure 1:
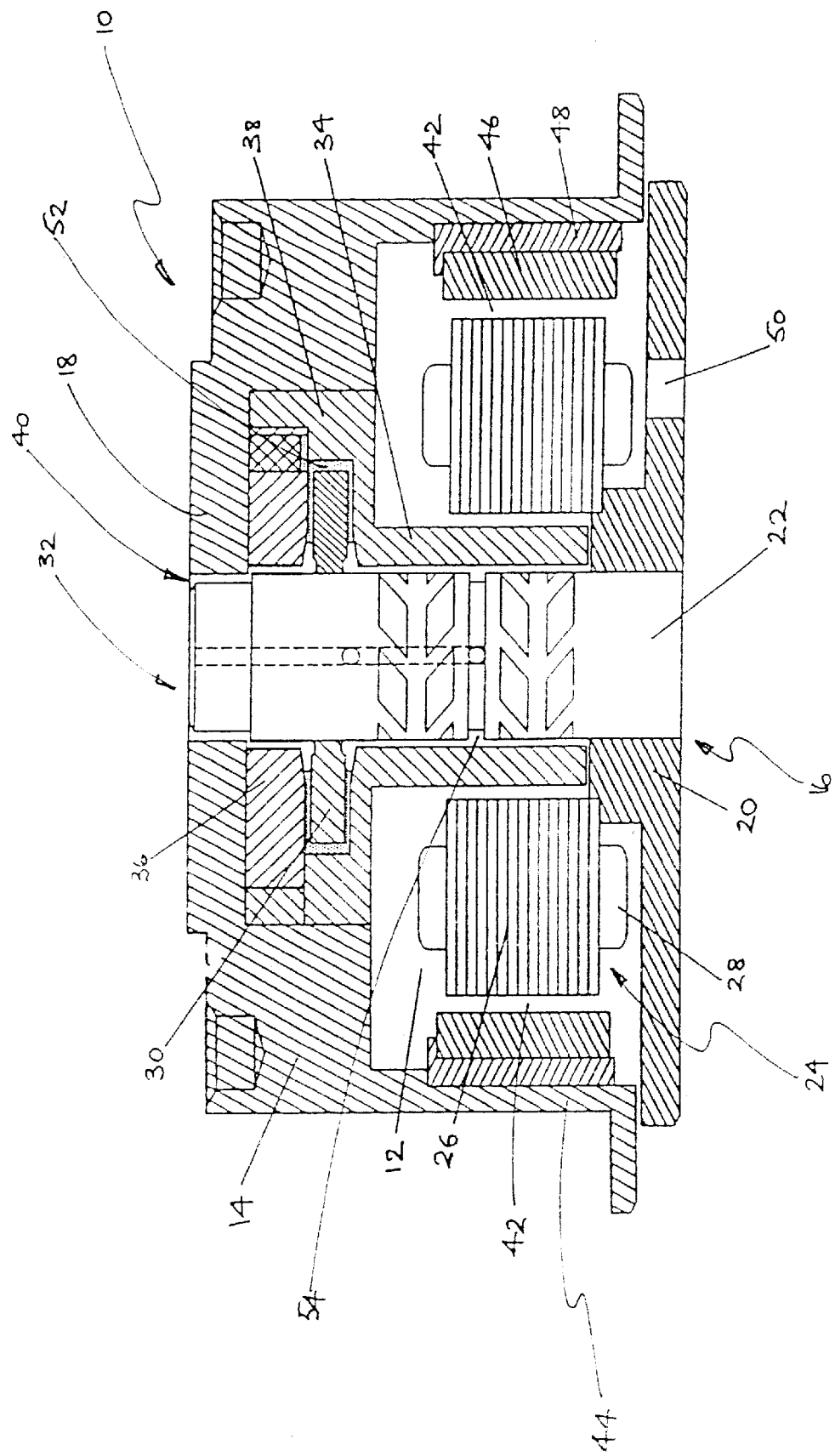
FIG. 1 is a cross-sectional view of a spindle motor according to a preferred embodiment of the present invention.
Figure 2:
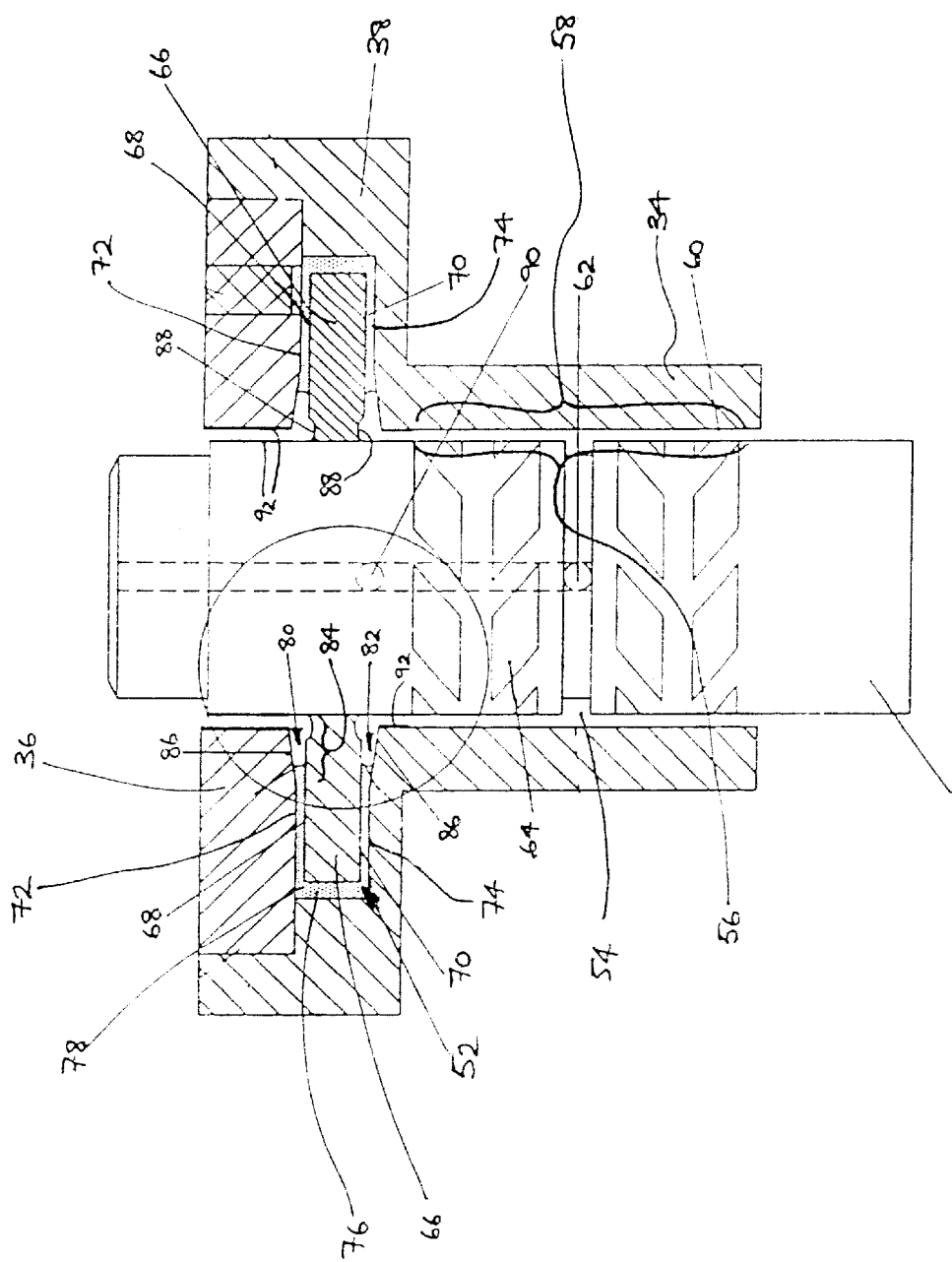
FIG. 2 is a detailed cross-sectional view of the spindle motor shown in FIG. 1.
Figure 3:
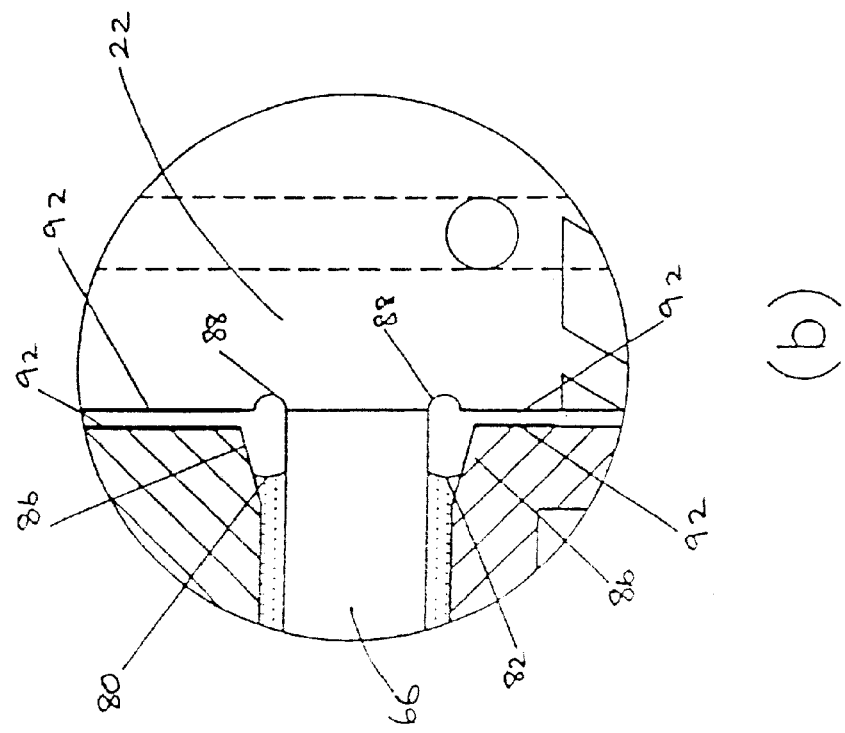
FIG. 3 shows two arrangements of a non-contact liquid seal for the liquid-filled thrust bearing of the spindle motor shown in FIG. 1.
Figure 3:
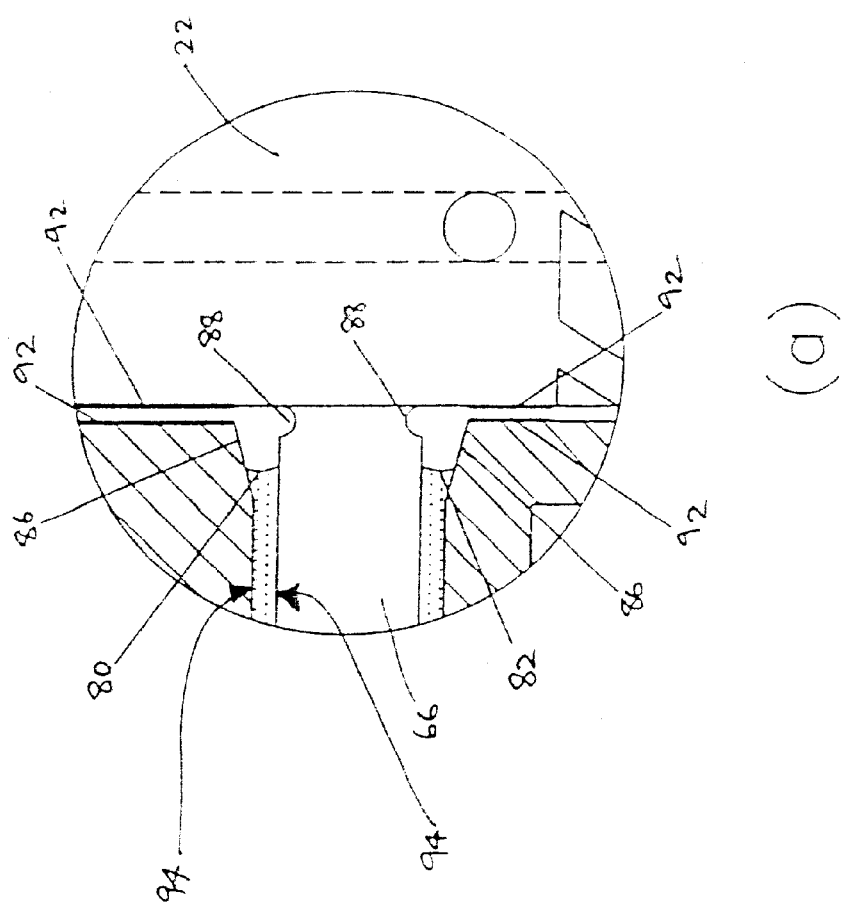

A preferred embodiment of the present invention is shown in FIG. 1. The motor 10 illustrated is of the brushless type but the present invention may also be used with other types of motors. The spindle motor 10 comprises a stator component 16 and a rotator component 18.

The stator component 16 comprises a base assembly 20, a cylindrical shaft 22, and a stator 24 which comprises a lamination core 26 and armature windings 28. An annular member 30 is coaxially mounted near a free end 32 of the shaft 22.

The rotor component 18 comprises a cylindrical sleeve 34 which is rotatable about the shaft 22, first and second thrust sleeve members 36, 38, which are fitted to the sleeve 34 to define a recess for receipt of the annular member 30, and a rotatable hub 14. The hub 14, preferably made of aluminum alloys forms a housing 12 for accommodating all the components of the motor. The hub 14 houses the thrust sleeve members 36, 38 and has a cylindrical hole 40 at the top end to accommodate the shaft 22.

The stator component couples with the rotor component such that a gap 42 is formed between the outer surface of the lamination core 26 and the inner surface of a rotor 44 which is mounted to the hub 14. The rotor 44 comprises ring-shaped magnetic poles 46 and a rotor back iron 48 which is bonded to the inner surface of the hub 14. The rotor back iron 48 provides a magnetic path for the magnetic field of the motor 10. Terminal leads from the armature windings 28 are fed from the motor housing 12 through a terminal lead aperture 50 and are connected to a power supply via a motor control circuit. The armature windings 28 are energised according to control logic which regulates speed of the motor 10. When the armature windings 28 are energised, an electromagnetic torque is developed by the interaction between magnetic fields of the magnetic poles 46 and the armature windings 28, causing rotation of the hub.

The preferred embodiment of the present invention provides a liquid-filled thrust bearing 52 and a gas-filled journal bearing 54 to support the axial and radial load during rotation.

For that purpose, the shaft 22 further comprises a journal bearing portion, defining an inner surface 56 of the journal bearing 54. A mating surface of the journal bearing 54 is formed on an inner surface of the sleeve 34 and defines an outer surface 58 of the journal bearing 54 which is radially spaced from the inner surface 56 of the journal bearing 54 to form a journal bearing clearance 60. The journal bearing clearance 60 is filled with a gas, preferably air, for lubrication. A gas passageway is provided with an opening 62 substantially midway along the length of the journal bearing 54 for assisting the flow of gas through the motor 10 to the bearing 54 and, in particular, for preventing stagnation of the flow of gas which can cause difficulty in starting rotation of the journal bearing 54. Aerodynamic pressure is generated in the journal bearing 54 during the operation thereof and is used to support radial loads of the shaft 22. Grooves 64, preferably in a herringbone pattern, are provided on the inner surface 56 of the journal bearing 54 to enhance performance, and, in particular, bearing stiffness.

Axial loads of the shaft 22 are supported by the thrust bearing 52 which produces hydrodynamic pressure during the operation thereof. The thrust bearing 52 comprises the annular member 30 in the form of a thrust bearing plate 66 which is mounted coaxially near the free end of the shaft 22 and which includes a first thrust face 68 and a second thrust face 70. First and second bearing surfaces 72, 74, corresponding to the first and second thrust faces 68, 70, are formed on interior surfaces of first and second thrust sleeve members 36, 38 respectively, which define the recess 76 for receipt of the bearing plate 66. The recess 76 is dimensioned to be slightly larger than the thrust bearing plate 66 which resides therewithin, such that a thrust bearing clearance 78 is defined. The thrust bearing clearance 78 is filled with a liquid lubricant, the lubricant being sealed within the clearance 78 by non-contact sealing means in the form of first and second surface tension seals 80, 82. The formation of the surface tension seals 80, 82 is facilitated by an increase in the thrust bearing clearance 78, on both sides of the thrust bearing plate 66, at a portion 84 thereof which is substantially adjacent to the shaft 22. The increase in thrust bearing clearance 78 may be achieved by forming tapered portions 86 in the bearing surfaces 72, and/or by forming annular grooves 88 in the thrust faces 68, 70. Annular grooves may also be formed in the shaft 22 adjacent the thrust bearing plate 66. The surface tension seals 80, 82 ensure that the liquid does not migrate from the thrust bearing clearance 78, whilst achieving relatively minimal frictional losses when compared to typical contact type seals.

A thrust bearing gas passageway 90 is provided to reduce the effect that the aerodynamics of the journal bearing 54 have on the surface tension seals 80, 82. In particular, the thrust bearing gas passageway 90 maintains equilibrium between the first and second surface tension seals 80, 82 so that the liquid remains within the thrust bearing clearance 78. Preferably, the surfaces adjacent to the surface tension seals 80, 82 are provided with an anti-migration coating 92 to assist in the prevention of migration of liquid from the thrust bearing clearance 78. When the hub is rotated, especially at high speeds, hydrodynamic pressure is generated in the thrust bearing 52 and is preferably sufficient to solely support the hub in at least both axial directions. Grooves 94 are provided at the thrust faces 68, 70 and/or the bearing surfaces 72, 74 to facilitate the formation of hydrodynamic pressure. The thrust bearing plate 66 may be radially outwardly tapered, in which case the thrust bearing 52 also offers some radial support to the sleeve 34 of the hub.

Figure 4:
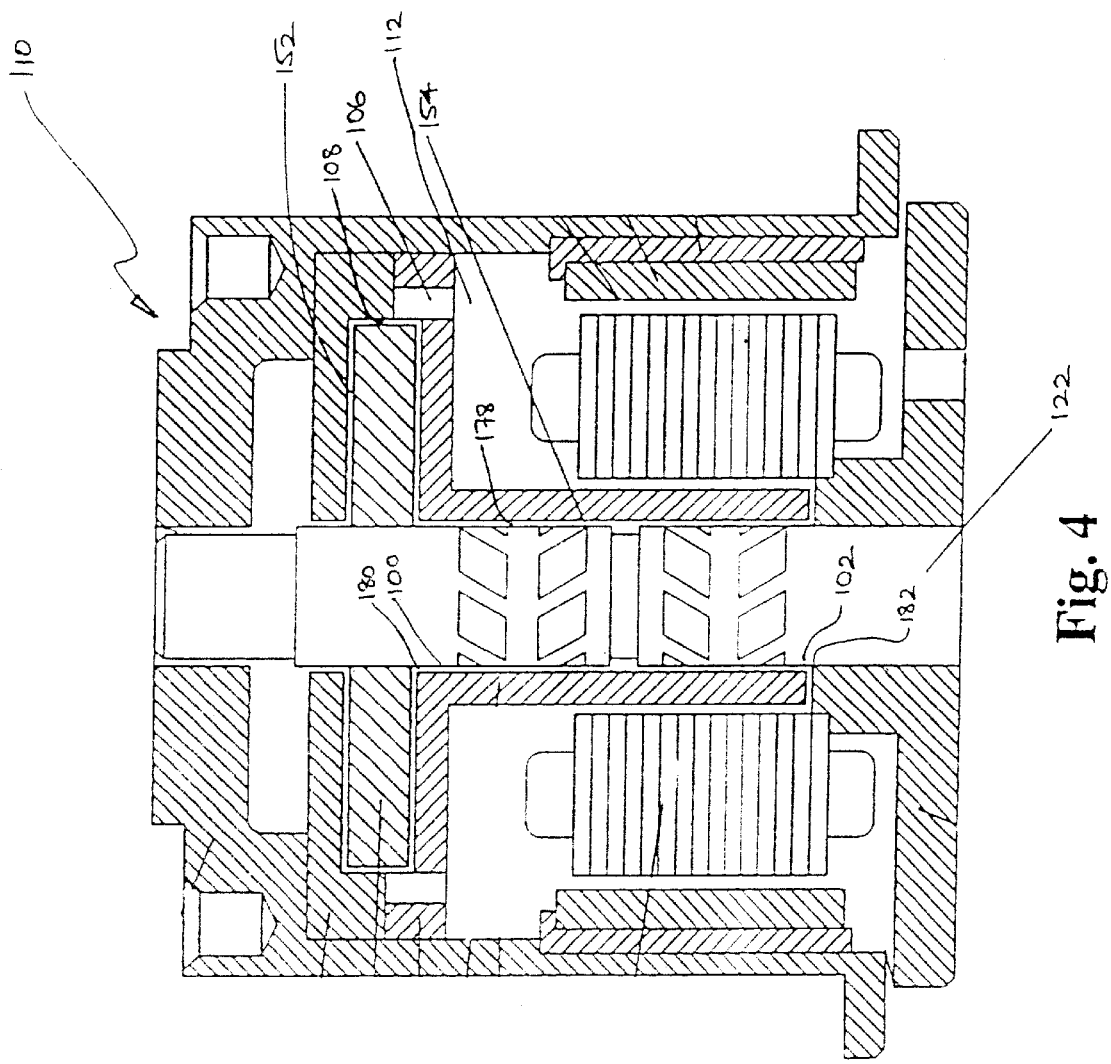
FIG. 4 is a cross-sectional view of a modified spindle motor.
Figure 5:
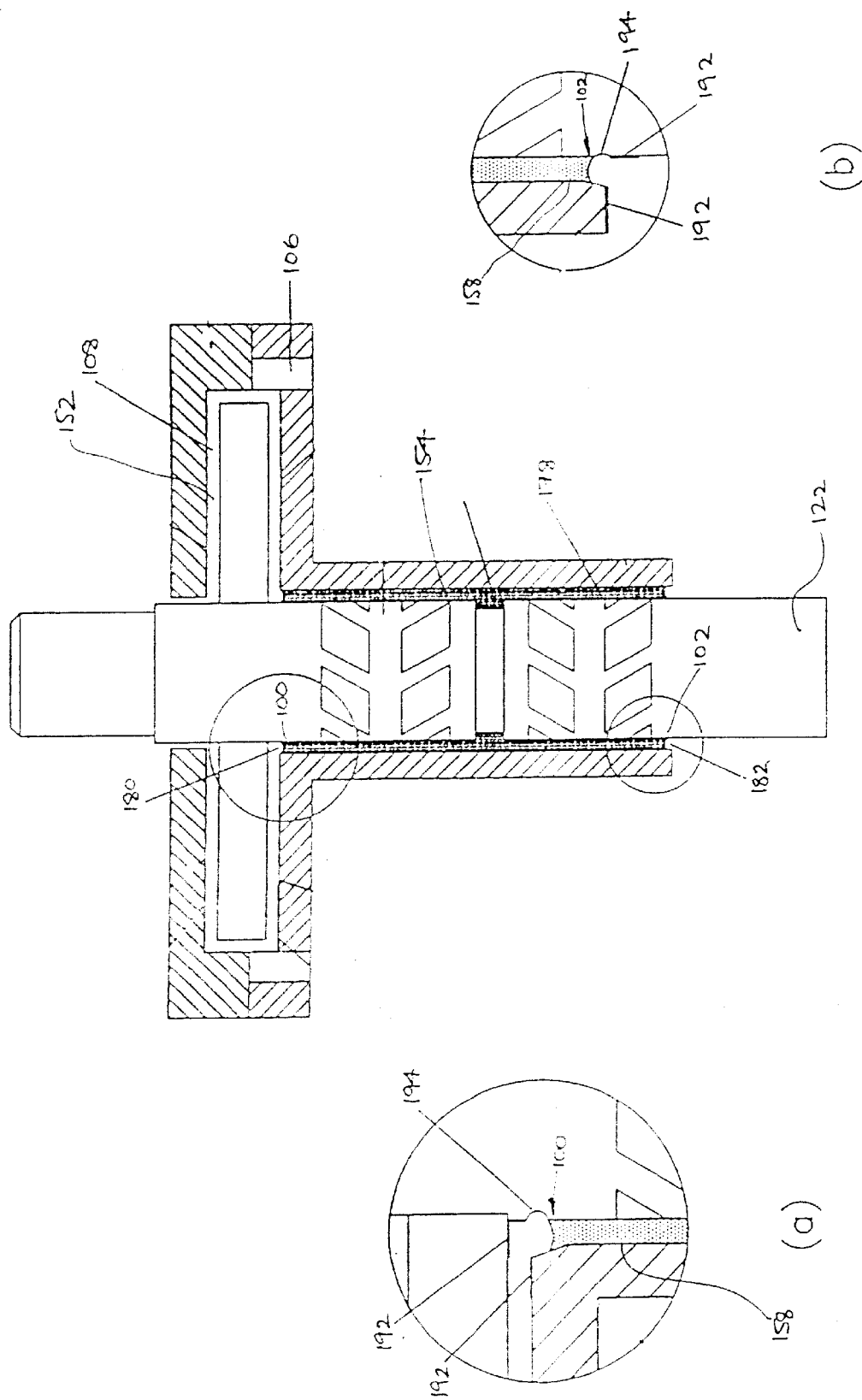
FIG. 5 is a detailed cross-sectional view of the gas-filled thrust bearing and the liquid-filled journal bearing of the spindle motor shown in FIG. 4.

In FIGS. 4 and 5, the spindle motor 10 is provided with a gas-filled thrust bearing 152 and a liquid-filled journal bearing 154. During rotation of the hub, support is provided at least axially by aerodynamic pressure in the thrust bearing 152, and radially by hydrodynamic pressures in the journal bearing 154. FIG. 5 shows an enlarged view of surface tension seals 180, 182 which are provided at a first end 100 and at a second end 102 of the journal bearing 154 for containing the liquid lubricant in the journal bearing 154. The formation of the seals 180, 182 is facilitated by an increase in the journal bearing clearance 178 at both the first end 100 and the second end 102 of the journal bearing 154. The increase in the journal bearing clearance 178 may be provided by outwardly tapering the outer surface 158 of the journal bearing 154 and/or by forming annular grooves 194 in the shaft 122, at both the first end 100 and at the second end 102 of the journal bearing 154. Surfaces adjacent to the dynamic tension seals 180, 182 may be provided with an anti-migration coating 192 to assist in the prevention of the migration of liquid from the journal bearing 154. A radially outward passageway 106 is provided from the thrust bearing plate-receiving cavity 108 to the motor housing 112. The radially outward passageway 106 allows smooth circulation of gas flow and prevents stagnation of gas flow in the thrust bearing 152.

As may be appreciated, the above described combinations of journal and thrust bearings allow for the advantageous use of both aerodynamic and hydrodynamic bearings whilst providing reliable support of the rotor component relative to the stator component regardless to the orientation of the spindle motor and/or to shocks, and minimizing space requirements of the motor, as compared to, for example, the teachings of U.S. Pat. No. 5,358,339.

Although the present invention has been described with reference to a preferred embodiment, it will be apparent to those skilled in the art that changes and modifications may be made in form and detail without departing from the spirit and scope of the invention.

What is claimed is:

1. A spindle motor including a stator component and a rotor component, said components including a shaft and a hub, said shaft and hub being provided for relative rotation and said hub for supporting one or more discs, said hub including a hub sleeve including a cylindrical portion surrounding said shaft, said motor comprising a bearing assembly between the components, formed of a journal bearing and a thrust bearing, wherein the journal bearing is an aerodynamic bearing provided between said shaft and said cylindrical portion of said hub sleeve and the thrust bearing is adapted to function in a bi-directional manner and includes an annular member projecting radially from one of the shaft and sleeve into an associated recess formed in the other of the shaft and sleeve, wherein the annular member has two opposed bearing faces arranged adjacent corresponding bearing surfaces of said recess portion, and a hydrodynamic thrust bearing is formed between the respective bearing faces and surfaces, both a hydrodynamic thrust bearing and an aerodynamic journal bearing thereby being provided between said shaft and said hub sleeve of said components.

2. A spindle motor as claimed in claim 1, wherein the journal bearing is formed between said shaft and said hub sleeve and the shaft is provided with a passage extending therethrough for providing air flow through the motor to the aerodynamic bearing, so as to allow air to be entrained into the journal bearing during operation.

3. A spindle motor as claimed in claim 2, wherein the bearing surfaces diverge from the bearing faces adjacent said shaft so that liquid between the annular member and said recess portion of said hub sleeve is retained therebetween by surface tension seals.

4. A spindle motor as claimed in claim 2 or 3, wherein the shaft includes a thrust bearing passageway which includes a port opening adjacent the annular member, between the thrust bearing and the journal bearing for equalising air pressure at either side of the journal bearing.

5. A spindle motor as claimed in claim 4, wherein the shaft is fixed relative to the stator and the hub sleeve forms part of the rotor.

6. A spindle motor as claimed in claim 3, wherein the annular member or shaft includes an annular groove to either side of the annular member to further assist in formation of the surface tension seals.

* * * * *